United States Patent [19]

Dunkley et al.

[11] Patent Number: 4,913,269

[45] Date of Patent: Apr. 3, 1990

[54] METHOD FOR SMOOTHING SKIP UP-SHIFTS IN AUTOMATIC/SEMI-AUTOMATIC MECHANICAL TRANSMISSION SYSTEM

[75] Inventors: Michael W. Dunkley, Preston; John E. Stainton, Chorley, both of England

[73] Assignee: Eaton Corporation, Cleveland, Ohio

[21] Appl. No.: 292,705

[22] Filed: Jan. 3, 1989

[30] Foreign Application Priority Data

Feb. 2, 1988 [GB] United Kingdom ................. 8802284

[51] Int. Cl.$^4$ ....................... B60K 41/22; B60K 41/28
[52] U.S. Cl. ................................. 192/3.63; 192/3.55; 192/3.62; 364/424.1
[58] Field of Search .................... 364/424.1; 192/3.63, 192/3.62, 3.55, 0.092

[56] References Cited

U.S. PATENT DOCUMENTS

| 4,081,065 | 3/1978 | Smyth et al. | 192/0.076 |
| 4,361,060 | 11/1982 | Smyth | 192/0.092 X |
| 4,373,619 | 2/1983 | Schritt et al. | 192/0.09 |
| 4,576,065 | 3/1986 | Speranza et al. | 192/0.094 X |
| 4,595,986 | 6/1986 | Daubenspeck et al. | 74/866 X |
| 4,621,545 | 11/1986 | Mohl | 74/866 |
| 4,648,290 | 3/1987 | Dunkley et al. | 192/0.08 X |
| 4,732,055 | 3/1988 | Tateno et al. | 364/424.1 X |

FOREIGN PATENT DOCUMENTS

| 0147227 | 7/1985 | European Pat. Off. | 192/3.63 |
| 0170465 | 2/1986 | European Pat. Off. | |
| 3544981 | 6/1987 | Fed. Rep. of Germany. | |
| 2100384 | 12/1982 | United Kingdom | 192/3.55 |

Primary Examiner—Rodney H. Bonck
Attorney, Agent, or Firm—H. D. Gordon

[57] ABSTRACT

A method for smoothing skip up-shifts in an automated mechanical transmission system (10) without requiring direct sensing of the rotational speed of the engine (14) is provided. The method involves delaying re-engagement of the master clutch (16) after engagement of a selected transmission ratio (E) during a skip up-shift by a period of time (T) directly proportional to the number (N) of ratios skipped and/or a function of the identity of the newly engaged ratio.

6 Claims, 2 Drawing Sheets

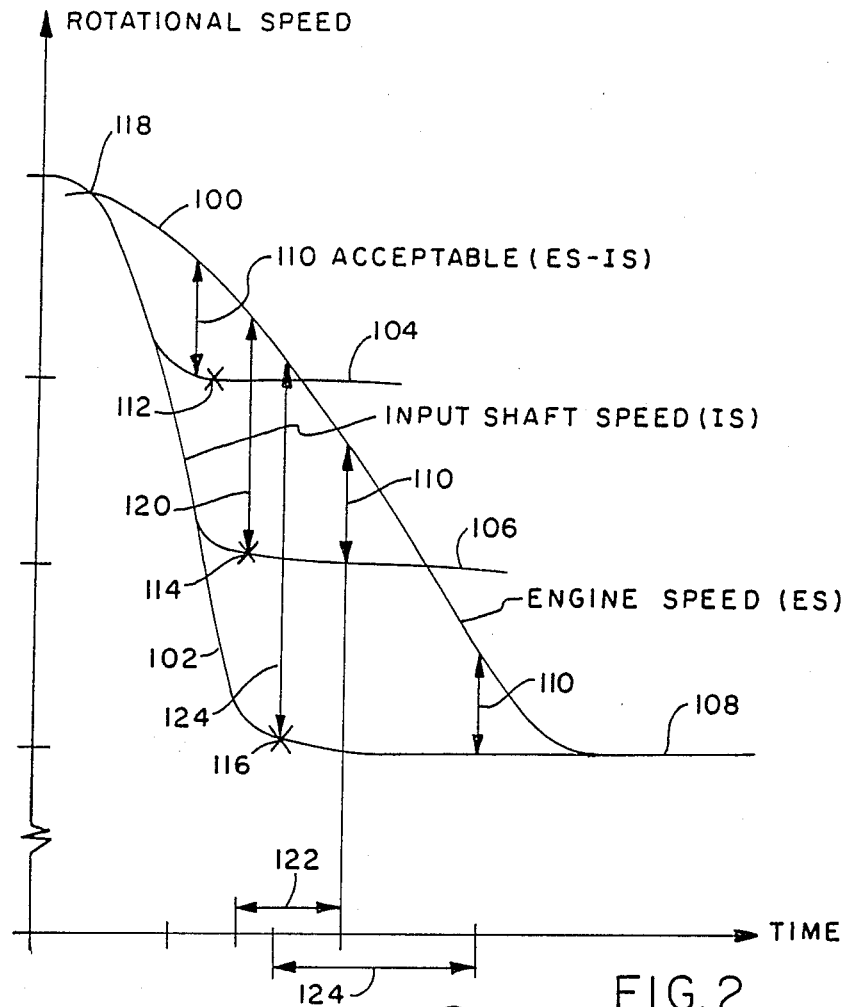
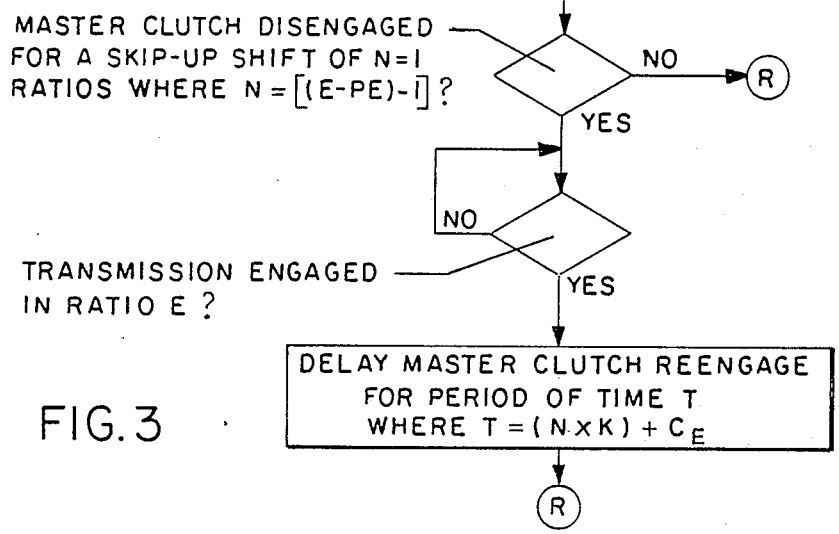
FIG. 2
FIG. 3

METHOD FOR SMOOTHING SKIP UP-SHIFTS IN AUTOMATIC/SEMI-AUTOMATIC MECHANICAL TRANSMISSION SYSTEM

BACKGROUND OF THE INVENTION

1. Field of The Invention

The present invention relates to a method for smoothing skip up-shifts in a vehicular automatic/semi-automatic mechanical transmission system, and in particular to a method for smoothing skip up-shifts in an automatic/semi-automatic mechanical transmission system which does not require an input signal indicative of the rotational speed of the engine.

2. Description of the Prior Art

Automatic and semi-automatic mechanical transmission systems for vehicles are well known in the prior art. Typically, such systems comprise a multi-speed mechanical change gear transmission, a master friction clutch drivingly interposed the engine and the transmission and a central processing unit or controller for receiving input signals from sensors and issuing command output signals to actuators for operation of the system according to predetermined logic rules. Systems of this type are known in the prior art, as may be seen by reference to U.S. Pat. Nos. 4,081,065; 4,361,060; 4,595,986 and 4,648,290, the disclosures of which are hereby incorporated by reference.

Logic rules for allowing and/or commanding an automatic/semi-automatic transmission skip shift, i.e. a direct shift of more than one ratio step, are also known in the prior art as may be seen by reference to U.S. Pat. No. 4,576,065, the disclosure of which is hereby incorporated by reference.

To provide smooth re-engagement of the friction master clutch, especially after a dynamic skip up-shift, re-engagement should be commanded only when the speed differential between the driving friction member(s) (rotating at engine speed) and the driven friction member(s) (rotating at transmission input shaft speed) is no greater than a predetermined reference value. This is especially true for systems having input shaft decelerating means, such as input shaft brakes, wherein the engine will decelerate considerably less rapidly than the transmission inPut shaft during an upshift routine. In the automatic/semi-automatic mechanical transmission systems of the prior art, to achieve a smooth up-shift, especially for systems allowing/commanding skip up-shifts, a sensor for sensing engine speed with the clutch disengaged was required.

SUMMARY OF THE INVENTION

In accordance with the present invention, the drawbacks of the prior art have been overcome or minimized by a method for smoothing master friction clutch re-engagement after an up-shift, including skip up-shifts, in an automatic/semi-automatic mechanical transmission system which does not require an input signal indicative of engine speed during conditions of master clutch disengagement.

The above is accomplished by providing logic rules for recognizing skip up-shifts wherein one, two, three or more ratio steps are skipped and providing a time delay as a function of a constant delay multiplied by the number of ratio steps skipped. Preferably the time delay is also a function of the to be engaged ratio as the difference between engine deceleration and braked input shaft deceleration is more pronounced at higher ratios (i.e. higher vehicle speeds).

By using this method, smoother skip upshifts are provided for semi-automatic and automatic mechanical transmission systems not equipped with an engine speed sensor or for fault tolerance routines wherein the engine speed sensor signal is declared invalid.

Accordingly, it is an object of the present invention to provide a logic routine for smoothing skip up-shifts in an automatic/semi-automatic mechanical transmission system which method does not require signals indicative of engine speed when the master clutch is disengaged.

This and other objects and advantages of the present invention will become apparent from a reading of the description of the preferred embodiment taken in connection with the attached drawings.

BRIEF DESCRIPTION OF THE DRAWINGS

FIG. 2 is a schematic illustration of engine and input shaft speeds during single and skip up-shifts.

FIG. 3 illustrates the logic flow chart for the method of the present invention.

DESCRIPTION OF THE PREFERRED EMBODIMENT

Figure 1:
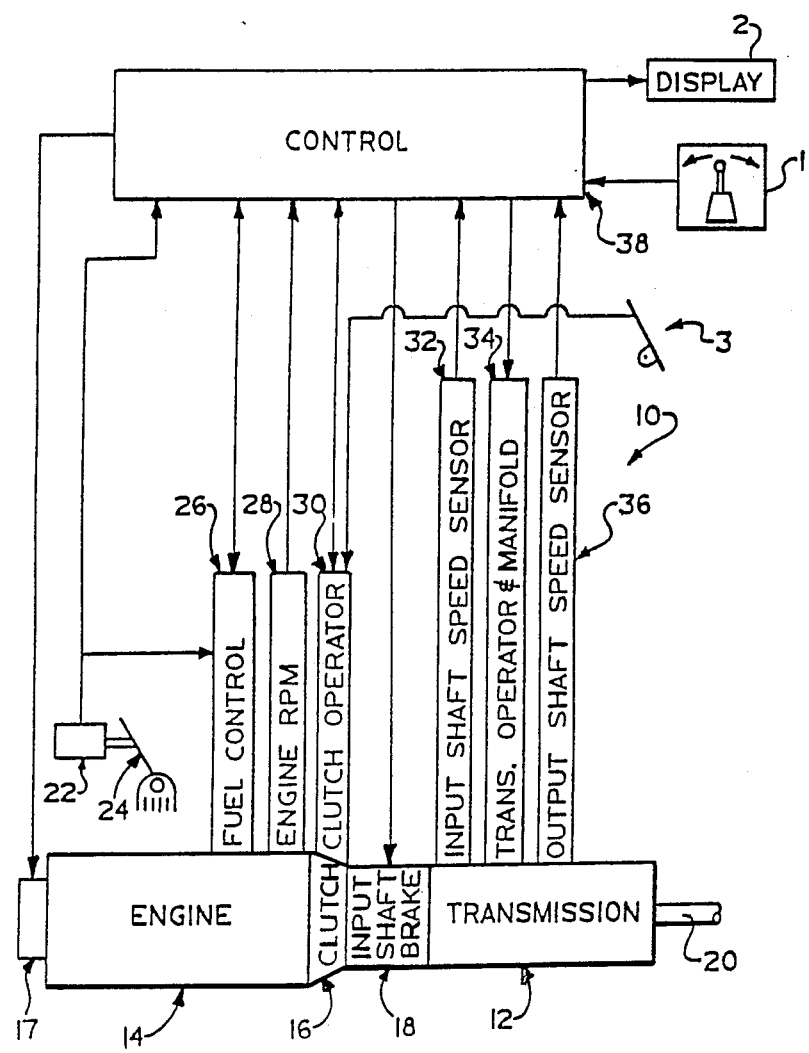
FIG. 1 is a schematic illustration of a semi-automatic mechanical change gear transmission system which is particularly well suited for the method of the present invention.

In the present description of the preferred embodiment, certain terminology will be used for descriptive purposes only and is not intended to be limiting. The terms "upward", "downward", "rightward" and "leftward" refer to directions in the drawings to which reference is made. The terms "inward", "outward", refer to directions toward and away from, respectively, the geometric center of a device, or portion thereof, being described. The above applies to derivatives of the terms above specifically mentioned, in terms of similar import.

The terms "upshift" as used herein shall mean shifting from a lower speed gear ratio into a higher speed gear ratio. The term "downshift" as used herein shall mean the shifting from a higher speed gear ratio to a lower speed gear ratio. The displacement between ratios refers to the number of selectable ratios between two given ratios, for example, third speed or gear ratio is displaced by one (1) and two (2) ratios, respectively from fourth and fifth speed, respectively, both in the downshift direction. By way of further example, a shift from a previously engaged (PE) third speed ratio directly into the to be engaged (E) sixth speed ratio is a displacement of three (3) speeds in the up-shift direction and a skip (N) of two (2) ratios in the up-shift direction.

The present invention is applicable, in principle, to the automatic or semi-automatic control of any type of mechanical change gear transmission wherein a control will issue command output signals to selected actuators to operate the system master clutch and transmission shifting mechanism to implement a transmission system ratio change which may be manually and/or automatically selected. Automatic/semi-automatic mechanical transmission systems of this type are known in the prior art and are disclosed in above-mentioned U.S. Pat. Nos. 4,081,065; 4,361,060 and 4,648,290. However, the method of the present invention is particularly advantageously applied to the control of automatic/semi-automatic mechanical transmission systems not utilizing direct engine speed sensors and/or having modes of operation, such as fault tolerance modes of operation, wherein the signals from an engine speed sensor are not utilized. An example of an automatic transmission control having an engine speed sensor fault tolerance mode of operation may be seen by reference to published European Patent Application Publication No. 0 241 216 published Oct. 14, 1987, the disclosure of which is hereby incorporated by reference.

Referring to FIG. 1, a typical semi-automatic mechanical transmission system with which a method of the present invention may be advantageously utilized is illustrated in schematic form. In the transmission system 10, the position of the driver operated throttle pedal 24 is sensed at a sensor 22 and fed to a central processing unit 38, which also receives inputs relative to transmission input shaft speed from sensor 32, transmission output shaft speed from sensor 36 and from an operator actuated control mechanism such as a gear shift lever, or "joy stick" 1 which may be utilized to request single or skip shifts in a selected direction. A sensor 28 for sensing engine RPM and providing input signals indicative thereof to the CPU 38 is not required but may be provided. It is understood that transmission input shaft speed is an indication of engine speed, and vice versa, when clutch 16 is nonslippingly engaged.

Control logic circuits, sensors, and actuators for the transmission system 10 as illustrated in FIG. 1, may be as disclosed in above-mentioned U.S. Pat. Nos. 4,081,065; 4,361,060; 4,595,986 and/or 4,648,290. Specifically, central processing unit 38 receives the indicated inputs, processes same in according with predetermined logic rules, and provides command output signals to pneumatic and/or electrical actuators to control an input shaft brake 18 for rapid upshifts of or automatic fuel control 26 to temporarily increase or decrease the supply of fuel to the engine to achieve synchronous rotation comparatory to a ratio shift, clutch control via clutch operator 30 and ratio shifting via transmission operator 34. The central processing unit may also send command output signals to a display 2. The semi-automatic mechanical transmission 10 may also comprise the usual foot operated manual clutch control 3 which may be required only for vehicle start-from-rest and/or low speed creeping maneuvering situations. The semi-automatic mechanical transmission system 10 also includes sources of electrical and/or pneumatic power (not illustrated).

In certain vehicular operating situations, the vehicle operator and/or the control 38 may command a skip up-shift from the previously engaged gear ratio (PE) to a desirably engaged ratio (E). Typically, skip up-shifts are demanded in those situations wherein the vehicle is relatively lightly loaded and is not traveling on a severe grade and it is desirable to avoid a series of rapid single up-shifts by shifting directly into a desirable higher gear ratio. In the 9, 10, 12, 13, 16 and 18-speed change gear transmissions commonly available in heavy duty trucks, it is not unusual for a skip up-shift of two ratios to occur, for example in a 16-speed transmission, for an up-shift directly from 13th speed to 16th speed. In such situations, especially if the transmission input shaft is provided with an input shaft brake, upon completion of the gear ratio change in the transmission 12, the speed differential between the driving and driven friction members of the master friction clutch will be unacceptably large for immediate re-engagement of the master friction clutch and, for an acceptably smooth shift, re-engagement should be prevented until the rotational speed differential is within accepted limits.

Referring to FIG. 2, the rotational speeds of the transmission input shaft and the vehicle engine are illustrated. It is understood, of course, that the driving and driven friction members of the master clutch rotate at engine and input shaft speeds, respectively. Line 100 is illustrative of engine speed deceleration upon disengagement of the master clutch 16 and decrease of the supply of fuel to the engine 14. Line 102 is illustrative of deceleration of the transmission input shaft upon disengagement of the master clutch and application of the input shaft brake 18. It is noted that under such conditions the input shaft will decelerate considerably more rapidly than the engine. Lines 104, 106 and 108, respectively, are illustrative of the rotational speeds of both the engine 14 and the transmission input shaft upon nonslipping full re-engagement of the master clutch 16 at substantially constant vehicle speeds after a single up-shift, a skip up-shift of one gear ratio and a skip up-shift of two gear ratios, respectively. Vertical line 110 is illustrative of the magnitude of the difference between engine speed (ES) and input shaft speed (IS) under which acceptably smooth master clutch re-engagement may occur. Points 112, 114 and 116 are illustrative of the time and input shaft speed at the time of engagement of the transmission ratio (E) selected for engagement during a single, a single skip, and a double skip up-shift, respectively. Point 118 is illustrative of the condition at the time of master clutch disengagement for a shift from the previously engaged (PE) gear ratio.

As may be seen, the event of a single up-shift, at point 112 when the transmission jaw clutches for the selected ratio are engaged, the magnitude of difference between the engine speed and the input shaft speed is within the acceptable range 110 and the master clutch may be immediately re-engaged. In the event of a single skip up-shift, at the point of transmission positive clutch engagement 114 the magnitude of difference between the engine speed and the input shaft speed 120 is considerably greater than the acceptable value 110 and a period of time 122 is required for the speed differential to reach acceptable limits. In the event of a double skip up-shift, at the time of transmission ratio engagement 116, the magnitude of the difference between engines and input shaft speeds 124 is considerably greater than the acceptable maximum 110 in a period of time 124 will be required for the speed differential to reach the acceptable maximum limit 110.

Assuming substantially constant ratio steps and substantially constant vehicle speeds, be required delay periods 122 and 124 are functions of a constant time period, such as time period 122, multiplied by the number of ratio steps skips.

In addition to the required time delay being a function of a predetermined constant multiplied times the number of ratio steps skipped during a skip up-shift, it has also been found that at the higher gear ratios a greater deceleration of the input shaft will occur and accordingly the magnitude of the required delay should also be a function of a constant, $C_E$, which is specific to the ratio to be engaged. By way of example, in a 12-speed transmission comprising a four speed main transmission section and a three speed splitter transmission section, applicants have discovered that a time delay T between engagement of the transmission clutches and re-engagement of the vehicle master clutch equaling approximately the number of ratios skipped (N) multiplied by a constant (K) equal to 200 milliseconds and adding to that product a constant ($C_E$) equal to ten milliseconds times the numerical designation of the ratio gear engaged provides acceptably smooth skip up-shifts.

A symbolic illustration of the method of the present invention, in flow chart format, may be seen by reference to FIG. 3. Briefly, the method comprises first sensing the initiation of a skip up-shift is defined as an up-shift of at least N equal to or greater than one ratios wherein N equals the numerical value of the ratio to be engaged E minus the numerical ratio of the previously engaged ratio PE minus one. For example, in an upshift directly from ninth to twelfth speed, E equals (12), PE equals (9) and N equals (3-1) equals 2. Upon sensing completion of the skip up-shift in the transmission master clutch re-engagement is delayed for a period of time T where T equals N times a constant (K) time period to which product is added a constant $C_E$ depending upon the numerical ratio to be engaged E.

Of course, the values of the constant K and the constant $C_E$ may be modified in view of the specific configuration of the drive train and/or the vehicle in which the automatic/semi-automatic mechanical transmission utilizing the method of the present invention is to be installed.

Although the preferred embodiment of the present invention has been described with a certain degree of particularity, various changes to form and detail may be made without departing from the spirit and the scope of the invention as hereinafter claimed.

We claim:

1. A method for controlling an automated mechanical change gear transmission section (10) comprising a fuel throttle controlled engine (14), a multi-speed change gear mechanical transmission (12), a master friction clutch (16) interposed the engine and the transmission, and a central processing unit (38) for receiving inputs and for processing same according to predetermined logic rules to issue command output signals to nonmanually controlled operators including a clutch operator 30 and a transmission operator (34), said command outputs including commands for disengagement of the master friction clutch, and commands for skip up-shifts for engagement of a new transmission ratio (E) displaced from the previously engaged transmission ratio (PE) by N ratios wherein N equals one less than the numerical value of the previously engaged speed ratio (PE) subtracted from the numerical value of the speed ratio to be engaged (E);

said method characterized by:

sensing engagement of the selected gear ratio (E) in the transmission;

delaying re-engagement of the master clutch for a period of time (T) wherein the value of the period of time (T) is a function of a constant (K) multiplied by the value of N.

2. The method of claim 1 wherein the value of T equals $(N*K)+C_E$ where;

$N=[(E-PE)-1]$

K = a predetermined constant and $C_E$ = a constant particular to the value of E.

3. The method of claim 1 wherein said automated transmission system additionally includes an input shaft brake (18) responsive to command output signals from said central processing unit.

4. The method of claim 1 wherein said automated transmission system additionally includes an input shaft brake (18) responsive to command output signals from said central processing unit.

5. The method of claim 2 wherein said automated transmission system additionally includes an input shaft brake (18) responsive to command output signals from said central processing unit.

6. The method of claim 1 wherein said automated transmission system does not include sensing means for directly sensing the rotational speed of said engine.

* * * * *